(12) United States Patent  (10) Patent No.: US 9,126,774 B2
Watson et al.  (45) Date of Patent: Sep. 8, 2015

(54) PNEUMATIC GRAIN CONVEYING APPARATUS FOR SELECTIVELY DISCHARGING GRAIN OR BY-PASSING THE DISCHARGE OF GRAIN INTO A GRAIN BIN

(71) Applicant: The GSI Group, LLC, Assumption, IL (US)

(72) Inventors: L. Michael Watson, Taylorville, IL (US); Robert C. Brush, Mattoon, IL (US)

(73) Assignee: THE GSI GROUP, LLC, Assumption, IL (US)

( * ) Notice: Subject to any disclaimer, the term of this patent is extended or adjusted under 35 U.S.C. 154(b) by 0 days.

(21) Appl. No.: 14/301,053

(22) Filed: Jun. 10, 2014

(65) Prior Publication Data

US 2014/0294519 A1  Oct. 2, 2014

Related U.S. Application Data

(62) Division of application No. 12/986,502, filed on Jan. 7, 2011, now Pat. No. 8,784,013.

(60) Provisional application No. 61/293,354, filed on Jan. 8, 2010.

(51) Int. Cl.
  *B65G 51/24*  (2006.01)
  *B65G 53/40*  (2006.01)
  (Continued)

(52) U.S. Cl.
  CPC .............. *B65G 53/40* (2013.01); *B65G 53/56* (2013.01); *F16K 1/2007* (2013.01);
  (Continued)

(58) Field of Classification Search
  USPC .................. 406/156, 158, 83, 144, 181, 182; 137/561 A; 251/343, 344
  See application file for complete search history.

(56) References Cited

U.S. PATENT DOCUMENTS 722,451 A  3/1903  Moser
1,597,438 A  8/1926  Ennis
(Continued)

OTHER PUBLICATIONS

Brock—Pneumatic Conveying Systems—Brock Super-Air Pneumatic Systems With Easy Dryer Interface—pamphlet—4 pages—May 2009.

(Continued)

*Primary Examiner* — Joseph Dillon, Jr.

(57) ABSTRACT

A pneumatic conveying system is disclosed for conveying a granular product, such as grain, from a grain inlet device to a selected one of a plurality of grain bins or other storage vessels. The system includes a blower for forcing air under pressure into a conveyor piping system. A grain inlet device is located downstream from the blower. The piping system has a portion leading from the grain inlet to an inlet in a first one of the vessels. A discharge/bypass valve is connected to a portion of the piping system leading from the grain inlet so as to receive the granular product being conveyed therethrough with the valve having a discharge outlet for discharging the granular product into the vessel. The valve is installed on the vessel such that the discharge outlet is in communication with the interior of the vessel. The valve further has an inlet coupling operatively connected to the piping system and an outlet coupling operatively connected to another portion of the piping system downstream of the valve leading to another of the vessels. The valve has a sleeve movable between a discharge position in which the inlet coupling is disconnected from the outlet coupling such that the granular product is discharged from the piping system into the valve and then is discharged into the vessel and a by-pass position in which the inlet and outlet couplings are operatively connected so that the granular product is conveyed through the valve and into the piping system downstream from the valve.

14 Claims, 8 Drawing Sheets

(51) Int. Cl.
  *B65G 53/56* (2006.01)
  *F16K 1/20* (2006.01)
(52) U.S. Cl.
  CPC ...... *F16K 1/2014* (2013.01); *Y10T 137/85938* (2015.04); *Y10T 137/87788* (2013.01); *Y10T 137/87812* (2015.04)

(56) References Cited

U.S. PATENT DOCUMENTS

| | | | |
|---|---|---|---|
| 1,669,084 A | | 5/1928 | Grindle |
| 2,781,233 A * | | 2/1957 | Witek .................. 406/182 |
| 3,194,607 A | | 7/1965 | Timmons et al. |
| 3,224,812 A | | 12/1965 | Bozich |
| 3,438,608 A | | 4/1969 | Wood |
| 3,446,372 A | | 5/1969 | Roach |
| 3,636,980 A | | 1/1972 | Maloney |
| 3,708,208 A | | 1/1973 | Fuss |
| 3,797,890 A | | 3/1974 | Walters |
| 3,884,528 A | | 5/1975 | Shaddock |
| 3,907,374 A | | 9/1975 | Steele |
| 3,930,457 A | | 1/1976 | Dedman et al. |
| 4,060,223 A | | 11/1977 | Bongartz et al. |
| 4,156,439 A | | 5/1979 | Jeffries et al. |
| 4,284,372 A | | 8/1981 | Smith |
| 4,469,135 A | | 9/1984 | Gray |
| 4,552,181 A | | 11/1985 | Hawkins |
| 4,669,505 A | | 6/1987 | Nelson et al. |
| 4,846,608 A | | 7/1989 | Sanders |
| 5,070,910 A | | 12/1991 | Mothersbaugh et al. |
| 5,186,205 A | | 2/1993 | Bachmann |
| 5,341,847 A | | 8/1994 | Rissik et al. |
| 5,354,152 A | | 10/1994 | Reinhardt et al. |
| 5,448,962 A * | | 9/1995 | Moody ................. 114/238 |
| 6,120,211 A | | 9/2000 | Raike |
| 6,619,525 B2 | | 9/2003 | Frankeburger et al. |
| 6,749,373 B2 | | 6/2004 | Von Geldern et al. |
| 6,964,544 B2 | | 11/2005 | Pfeiffer et al. |
| 7,114,889 B2 | | 10/2006 | Kanou et al. |
| 7,318,459 B2 | | 1/2008 | Frankeberger et al. |
| D647,542 S | | 10/2011 | Zwettler |
| 8,641,329 B2 * | | 2/2014 | Barrios ................ 406/182 |
| 2002/0168253 A1 | | 11/2002 | Musser |
| 2004/0222400 A1 * | | 11/2004 | McCarty et al. ........... 251/344 |
| 2007/0116526 A1 | | 5/2007 | Frankeberger et al. |
| 2012/0205492 A1 | | 8/2012 | Gelon |

OTHER PUBLICATIONS

DMC—David Manufacturing Co.—Grain Transfer—Grain Conveying Air Systems—Web page—www.dmc-davidmanufacturing.com/english/transfer.html—printed Jan. 5, 2010.
Sukup—Cyclone—Pamphlet—2 pages.
Bush & Wilton Conveying Diverters—Pressure Sealed Flap Type Conveying Diverter Valve—Pamphlet—2 pages.
DMC—David Manufacturing Co.—Trans-Fer—Grain Conveying Air Systems—Pamphlet—4 pages—Jan. 2006.

* cited by examiner

PNEUMATIC GRAIN CONVEYING APPARATUS FOR SELECTIVELY DISCHARGING GRAIN OR BY-PASSING THE DISCHARGE OF GRAIN INTO A GRAIN BIN

CROSS-REFERENCE TO RELATED APPLICATIONS

This is a division of co-pending U.S. application Ser. No. 12/986,502 filed Jan. 7, 2011, which in turn claims priority to U.S. Provisional App. No. 61/293,354 filed Jan. 8, 2010. Both of said applications are incorporated herein by reference.

STATEMENT REGARDING FEDERALLY SPONSORED RESEARCH OR DEVELOPMENT

Not Applicable.

BACKGROUND OF THE DISCLOSURE

In recent years, various pneumatic grain conveying systems have been employed for conveying grain to and from a grain storage bin or the like. These prior pneumatic grain conveying systems typically employed a positive displacement blower for forcing air into a closed duct or pipe system. Grain to be conveyed was introduced into the piping downstream of the blower by means of a so-called airlock grain inlet or other grain infeed device, which fed the grain into the pipe system in such a manner that the grain was entrained by the air flowing through the pipe system and in such a manner that the pressurized air was not lost thus maintaining the conveying capacity of the pneumatic conveying system. Downstream from the grain inlet the piping system may be directed upwardly, for example, along the sidewall of a grain bin, and along the sloped, conical grain bin roof to a center grain inlet opening in the roof, where a so-called deadhead deflector or a cyclone diffuser was positioned so as to allow the pressurized air to be vented to the atmosphere and to direct the grain into the grain inlet in the grain bin roof. Such pneumatic grain conveying systems have the advantage of moving the grain within a cushion of air that minimizes damage to the grain, as compared to mechanical grain auger conveyors or other types of mechanical grain conveying systems.

Figure 2:
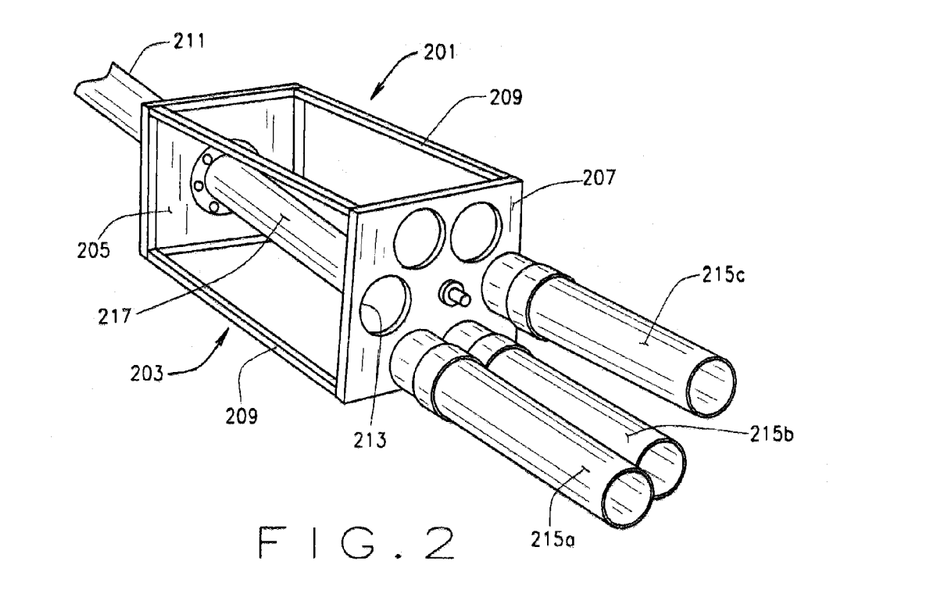
FIG. 2 is a perspective view of a prior art manifold/distributor assembly for connecting the pressurized air duct downstream from the airlock grain infeed to a selected one of a plurality of air conveying ducts or piping systems for conveying the grain to a selected one of a plurality of grain storage bins.

However, such pneumatic grain conveying systems, especially such pneumatic grain conveying systems having high capacity (e.g., 2,500 bushels/hour), require a powerful electric motor (e.g., up to 75 horsepower) for powering the positive displacement blower. Such motors are expensive. It is thus desirable to utilize the same motor and the same airlock grain infeed unit to convey grain to a plurality of grain storage bins. Heretofore, this has been accomplished by providing separate piping systems from the air lock to the various grain storage bins with a complex manifold/distributor, such as shown in FIG. 2 of the instant drawings and as will be hereinafter described, so as to permit the pressurized air duct from the grain infeed airlock to be selectively connected in an air tight fashion to a desired or selected piping system for a selected one of the plurality of grain storage bins. Not only did this prior manner of connecting the pressurized air conveying system to the piping system for a selected grain storage bin require the complex manifold/distributor, but it also required separate piping runs from the grain inlet airlock to each of the grain storage bins with each of these piping runs having a horizontal run along the ground and a vertical run along the vertical sidewall and conical roof of each bin. In turn, this added to the expense and complexity of such prior pneumatic conveying systems. These multiple runs of piping along the ground often interfered with vehicles which require close access to the grain bins. Still further, it has been found that such manifold/distributor systems are sometimes difficult to operate and they often require that the blower and airlock infeed be shut down while making a change from conveying to one bin and then to another bin.

SUMMARY OF THE DISCLOSURE

A pneumatic conveying system is disclosed for conveying a dry flowable or granular product, such as grain, from a grain inlet device to a selected one of a plurality of grain bins or other storage vessels. The system includes a blower for forcing air under pressure into a conveyor piping system. A grain inlet device is located downstream from the blower. The piping system has a portion leading from the grain inlet to an inlet in a first one of the vessels. A discharge/bypass valve is connected to a portion of the piping system leading from the grain inlet so as to receive the granular product being conveyed therethrough with the valve having a discharge outlet for discharging the granular product into the vessel and a by-pass outlet for by-passing the first vessel and delivering the granular product to a second vessel. The valve is installed on the vessel such that the discharge outlet is in communication with the interior of the vessel. The valve further has an inlet coupling operatively connected to the piping system and an outlet coupling operatively connected to another portion of the piping system downstream of the valve leading to another of the vessels. The valve has a sleeve movable between a discharge position in which the inlet coupling is disconnected from the outlet coupling such that the granular product is discharged from the piping system into the valve and then is discharged into the vessel and a by-pass position in which the inlet and outlet couplings are operatively connected so that the granular product is conveyed through the valve and into the piping system downstream from the valve. The by-pass outlet comprises the outlet coupling.

In one embodiment, the housing for the valve can be provided with a hopper. The hopper opens into the valve housing below the valve to be in communication with the interior of the vessel. The hopper can receive granular product from an auger, which need not be permanently affixed to the hopper. In this manner, the granular product can be delivered to the vessel via an auger without having to remove the discharge/by-pass valve.

A method of selectively conveying this granular product to a selected one of the vessels is also disclosed.

BRIEF DESCRIPTION OF THE DRAWINGS

FIG. 1 is a diagrammatic side elevational view of a typical pneumatic grain conveying system having a positive displacement blower forcing pressurized air into a piping system with an airlock grain infeed downstream from the blower, with a piping system conveying the grain upwardly along the vertical sidewall and along the conical roof of a first grain storage bin (only half of which is illustrated) or other receiving vessel to a so-called grain discharge/by-pass valve of the present disclosure mounted on a center grain inlet in the roof of the first bin, with a reach of piping extending from the outlet of the discharge/by-pass valve to a deadhead deflector mounted on a center grain inlet of a second grain storage bin (again, only one half of the bin is illustrated) or other vessel so that with the discharge/by-pass valve on the first bin in its discharge position grain may be discharged into the first grain bin and so that with the discharge/by-pass valve in its by-pass position grain may by-pass the first bin to be discharged into the second bin;

Corresponding reference characters indicate corresponding parts throughout the several views of the drawings.

DESCRIPTION OF PREFERRED EMBODIMENTS

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting Referring now to the drawings and particularly to FIG. 1, a pneumatic grain conveying system, as indicated in its entirety at 1, is shown to be installed on a plurality of grain storage bins or vessels 3 and 5. Two grain bins 3 and 5 are shown, but those of ordinary skill in the art will understand that additional grain bins can be connected to one another in the manner that bin 3 is connected to bin 5. As is typical, each of the grain bins has a vertical sidewall 7, a sloped conical roof 9, and a grain inlet 11 at the peak of the conical roof.

Figure 1:
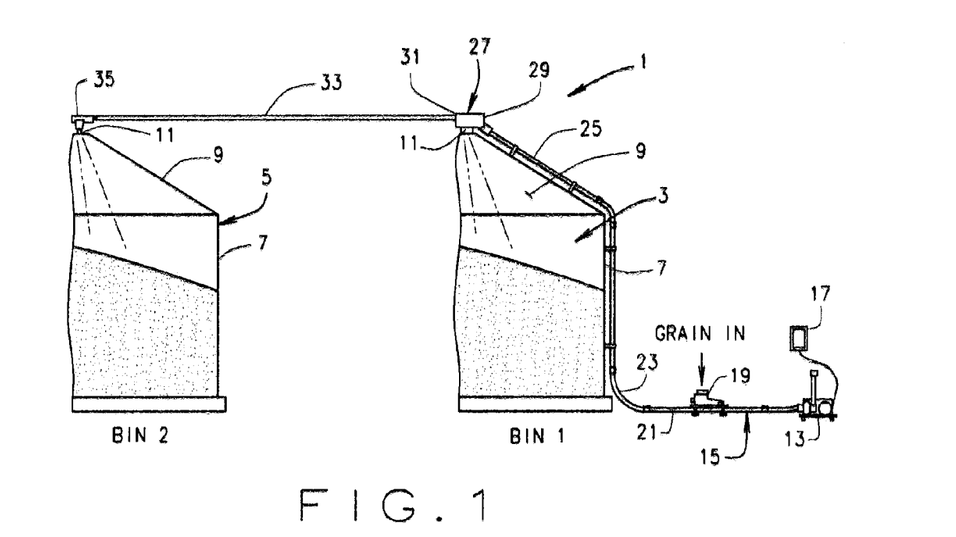

The pneumatic grain conveying system 1 includes a motor and blower assembly 13 (preferably a positive displacement blower), which forces pressurized air into a conveyor piping system 15. The blower and motor are controlled by a control panel 17. Downstream of the blower, a so-called airlock/grain infeed unit 19 is provided for introducing grain (or other granular, powdered or pulverulent flowable material capable of being pneumatically conveyed) to be introduced into the pressurized air stream moving through piping system 15. Piping system 15 includes a horizontal run 21 leading to a horizontal-to-vertical elbow 23, which in turn is connected to a vertical run 25 extending upwardly along the sidewall 7 of the first grain bin. The piping system further includes a sloped run 25 along the conical roof 9 of the first grain bin toward the inlet 11 of the first grain bin.

A discharge/by-pass valve 27 is installed in register with the grain inlet 11 of the first grain bin. The valve 27 has an inlet 29 coupled to the downstream end of the sloping run 25 and an outlet 31 coupled to pneumatic conveyor tube 33 extending from the valve 27 to a deadhead deflector 35 installed on the grain inlet 11 of the second grain bin 5. This deadhead deflector 35 allows the pressurized air to escape to the atmosphere thus disrupting the flowing airstream in the conveyor piping run 33 and deflects the grain conveyed through piping run to be discharged into the second grain bin. While not illustrated, it will be understood that in place of the deadhead deflector 35 installed on the grain inlet 11 of the second grain bin, another valve 27 may be installed on the grain inlet of the second bin and another run of piping (not shown) may be connected to the outlet end 31 of this other valve 27, where this other run of piping leads to the grain inlet 11 of another (i.e., a third) grain bin (not shown) so that grain conveyed to the second bin via the piping run 33 may be selectively discharged into the second bin or may be selective by-passed to the next grain bin. In this manner, the pneumatic conveying system 1 utilizing valves 27 may selectively convey grain to any one of a plurality of grain bins merely by operating the valves 27 installed on the grain inlets 11 of the grain bins upstream of the selected bin to be in their by-pass positions and by operating the valve 27 (or a deadhead valve 35) installed on the selected bin in its discharge position. As will become apparent, the discharge/by-pass valves 27 can be operated to selectively alter the bin or vessel in which the grain is to be deposited without the need to shut down the pneumatic conveying system.

In FIG. 2, a prior art distributor manifold/selector valve assembly is indicated in its entirety by reference character 201. The distributor manifold/selector valve 201 includes a frame 203 having a base plate 205, a head plate 207, and elongate spacer members 209 extending between the base plate and the head plate. An inlet piping section 211 is adapted to be connected to the pneumatic piping system 15 downstream from airlock grain in feed unit 19. Preferably, the distributor/manifold assembly 201 is installed adjacent the first grain bin. The head plate 207 has a plurality of manifold ports 213 (six such ports are shown) such that a selected piping run, as indicated at 215a, 215b, 215c, may be operatively connected to the inlet piping section 211. Each of these last-noted piping runs leads to a respective grain bin so that grain may be selectively conveyed to that grain bin. A selector pipe 217 coupled to the inlet pipe 211 may be selectively coupled to a selected one of the manifold ports 213, and thus to a selected one of the piping runs 215a, 215b or 215c so as to convey grain to the grain bin corresponding to that piping run.

Figure 3:
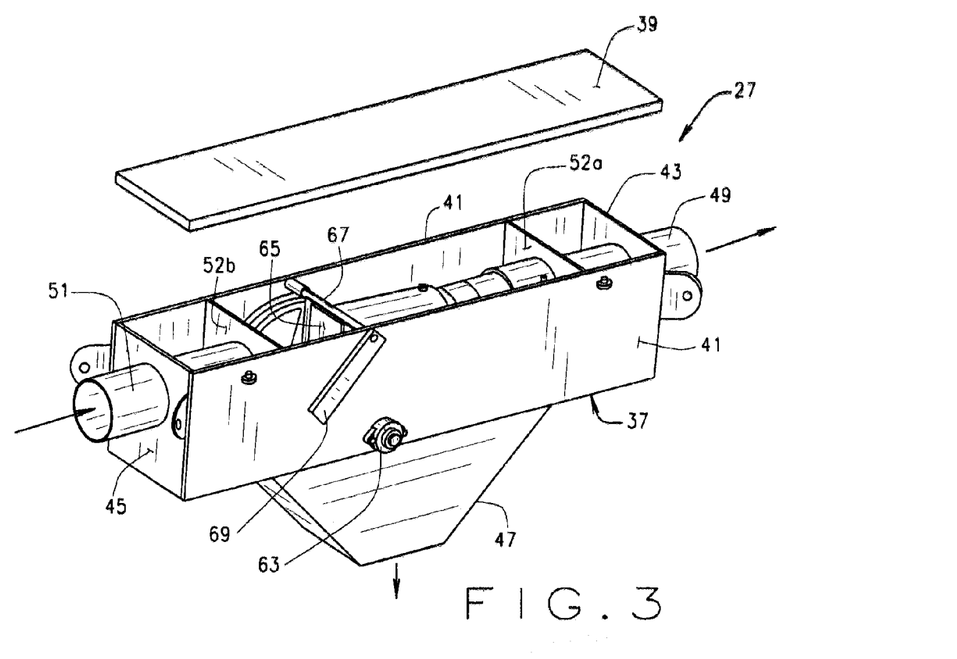
FIG. 3 is a perspective side elevational view of a first embodiment of a discharge/bypass valve of the present disclosure with the valve in a discharge position to discharge grain into the bin on which the valve is mounted.
Figure 4:
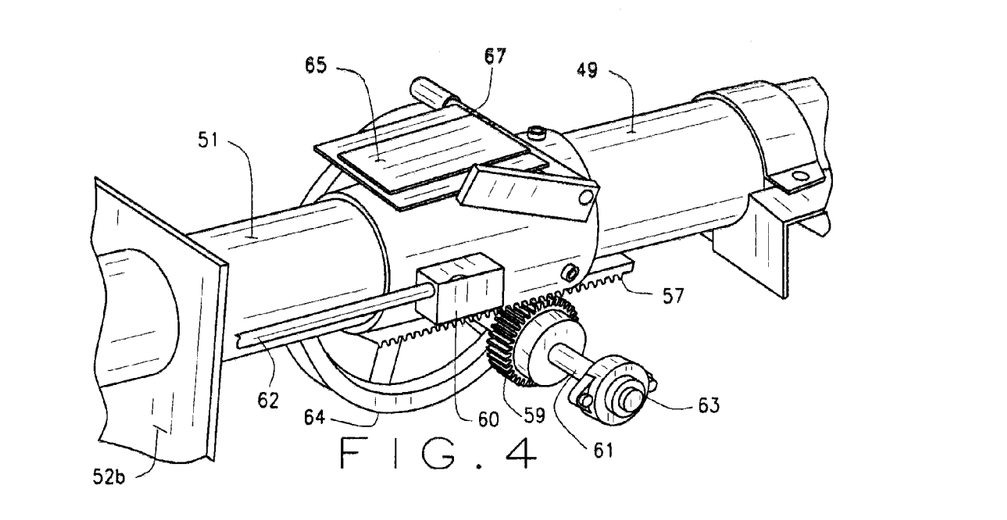
FIG. 4 is a perspective view of a portion of the valve shown in FIG. 3 with the exterior housing of the valve removed to better illustrate the components within the housing with these components arranged in a by-pass position so that grain conveyed to the valve will not be discharged into the grain bin on which it is installed but rather will by-pass the grain through the valve into a piping run that will convey the grain to another grain storage bin, with the components of the valve including a rack and pinion linear drive for axially moving a sleeve between a by-pass position (as shown in FIG. 4) in which the grain is pneumatically conveyed through the valve and a discharge position, as shown in FIGS. 3, 5 and 6, in which grain is discharged into the bin below the valve.
Figure 5:
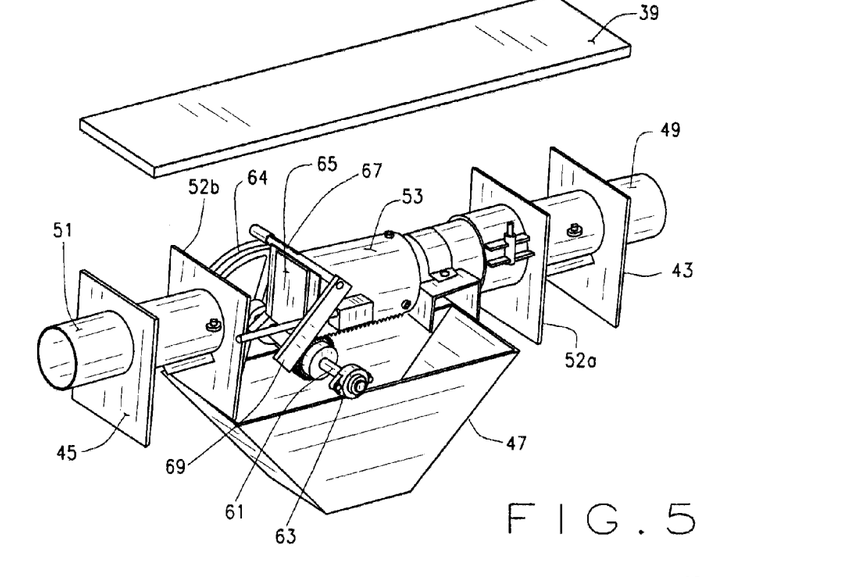
FIG. 5 is another view of the valve as shown in FIG. 4 with its components arranged in their discharge position with a flapper diverter member disposed at the outlet end of the above-noted sleeve so as to direct grain conveyed through the sleeve downwardly into the bin on which the valve is mounted.
Figure 6:
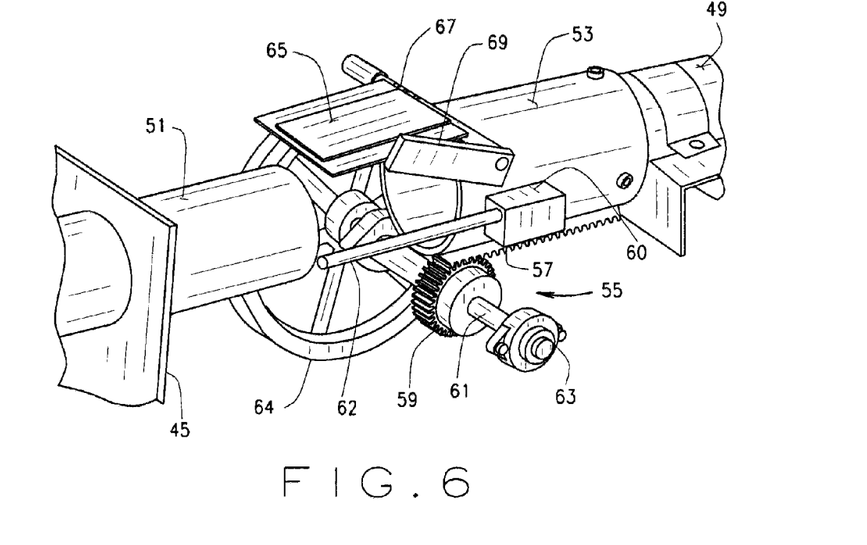
FIG. 6 is a view similar to FIG. 5 in which the flapper diverter member is raised clear of the end of the sleeve so as to permit the sleeve to be moved axially to be coupled to the piping downstream of the valve when the sleeve is in its by-pass position.

Referring now to the valve 27 installed on the first grain bin (as shown in FIG. 1), a first embodiment of the valve is illustrated in FIGS. 3-6. As shown best in FIG. 3, the valve 27 includes an exterior housing 37 having a top housing panel 39, side panels 41, an outlet end plate 43, an inlet end plate 45, a bottom plate (not shown in FIGS. 3-6), and a bottom hopper discharge chute 47 defining a discharge outlet through which grain is discharged into the grain inlet 11 of the bin supporting the valve 27. The inlet end plate 45 has an inlet coupling tube 51 adapted to be coupled to the sloped piping reach 25, and the outlet end plate 43 has an outlet coupling tube 49 adapted to be coupled to piping run 33. As will become apparent, the outlet coupling tube defines a by-pass outlet of the valve 27. The inlet coupling tube 51 is rigidly and sealably secured to its inlet plate 45 and the outlet coupling 49 is rigidly and sealably secured to its outlet plate 43 with the inlet and outlet coupling tubes being substantially coaxial with respect to one another and with a space between their inner ends, as shown in FIGS. 5 and 6. As indicated at 52a and 52b, internal support plates support the inner ends of tubes 49 and 51, respectively, within housing 37.

A valve member, shown as a sleeve 53 in the drawings, is axially movable relative to the inlet and outlet coupling tubes 49 and 51 by means of an actuator (a linear actuator as will be hereinafter described), as generally indicated at 55, as shown in FIGS. 4-6. The sleeve valve member 53 is movable in an axial direction with respect to the inlet and outlet coupling tubes between a first or by-pass position (more specifically, an extended coupling position as shown in FIG. 4) in which grain conveyed to valve 27 will be conveyed through or by-passed through the valve to the next grain storage bin downstream from the bin on which the valve 27 is installed, and a second or discharge position (more specifically, a retracted position as shown in FIGS. 3, 5 and 6). With the sleeve 53 axially uncoupled from inlet coupling tube 51, the pressurized air within the piping system 15 will be discharged into housing 37, which is vented to the atmosphere and so that the grain entrained in the air stream flowing through the inlet coupling tube 51 will fall by gravity downwardly into the discharge chute 47. The linear actuator 55 is also operable so as to axially move the sleeve 53 from its retracted discharge position (as shown in FIGS. 3, 5 and 6) to its extended by-pass position (as shown in FIG. 4) in which the sleeve is sealably coupled to the inlet tube 51. With the sleeve in its by-pass position, the pressurized air stream and the grain entrained therein will be conveyed through the valve 27 and will be conveyed via piping run 33 to the next grain storage bin. Although the sleeve 53 is shown to be moved toward and away from the inlet coupling tube 51 by the actuator 55, the valve sleeve could alternatively be positioned over the inlet coupling tube, so that the actuator 55 moves the sleeve 53 toward and away from the outlet coupling tube 49.

As shown in FIGS. 4-6, the linear actuator, as generally indicated at 55, comprises a rack and pinion mechanism having a rack 57 attached to the bottom of sleeve 53 and a pinion 59 journalled on a shaft 61 supported by bearings 63 carried by the housing side walls 41. The shaft 61 may be selectively rotated by means of a sheave 64, wheel, or the like attached to one end of the shaft 61. The sheave may be rotated by any suitable means, such as an electric motor (not shown), or by means of a chain or belt and pulley arrangement (also not shown) that may be manually operated from ground level. Alternatively, the linear actuator may be a fluid cylinder (not shown), such as an air or pneumatic cylinder, that may be remotely actuated so as to move the sleeve 53 between its extended by-pass position and its retracted discharge position. Further, those skilled in the art will recognize that other well known linear actuators, such as a screw drive or the like, may be used. Such linear actuators thus constitute a means for selectively moving the sleeve 53 in an axial direction between its extended by-pass position and its retracted discharge position so that grain may be selectively discharged into the bin below the valve 27 or by-passed to the next bin downstream from the bin on which the valve 27 is installed.

A block 60 is mounted to the sleeve 53 and a post 62 extends forwardly from the block. The post 62 slides through an alignment hole in the support plate 52b, to ensure axial alignment of the sleeve 53 with the inlet coupling tube 51 as the sleeve 53 is moved to its extended position in which the sleeve 53 is connected to the inlet coupling tube 51. The exit end of the inlet coupling tube 51 is tapered to facilitate guiding of the sleeve 53 over the inlet coupling tube when the sleeve is moved to its extended position. The ends of the sleeve 53 can also be tapered.

The sleeve 53 has an inner diameter greater than the outer diameter of the inlet coupling tube 51 and the outlet coupling tube 49. The inlet and outlet coupling tubes 51 and 49 are of generally the same inner and outer diameter. The sleeve 53 can thus slide over both the inlet and outlet coupling tubes. The sleeve 53 is provided with internal O-rings 54 at both ends of the sleeve. The O-rings form an air-tight seal between the sleeve 53 and both the inlet and outlet coupling tubes 51 and 49 when the sleeve 53 is in the extended position. This substantially eliminates air (and thus air pressure) loss when the sleeve is in the extended position, to facilitate the transport of the product to the second bin. Although the O-rings are described as being internal O-rings on the sleeve 53, the O-rings could be external O-rings on the inlet coupling tube and the outlet coupling tube. Any other desired means to form an air-tight seal between the sleeve 53 and the inlet and outlet coupling tubes may also be used. As can be appreciated, the valve 27 provides for an air-tight or pneumatically sealed connection when the sleeve 53 is in its extended position, and an unsealed, atmospheric connection when the sleeve 53 is retracted.

As further shown in FIGS. 3-6, a diverter or deflector member 65, illustratively shown as a flapper or plate, is mounted on a shaft 67 above the sleeve 53 for movement between a raised, retracted position (as shown in FIGS. 4 and 6) in which the diverter member is clear of the sleeve and a lowered, diverting position (as shown in FIGS. 3 and 5) in which the diverter member 65 is positioned in a discharge space between the retracted sleeve 53 and the outlet end of inlet coupling tube 51 so that grain conveyed through the inlet coupling tube 51 will impinge against the diverter member and be directed downwardly into discharge chute 47. The diverter member 65 is pivoted from its lowered position to its raised position by the axial movement of the sleeve 53. That is, as the sleeve 53 is moved axially to its extended by-pass position, the sleeve 53 will engage the diverter member 65 and pivot the diverter member to the raised position. The diverter member 65 is gravity biased toward its lowered, diverting position by means of its own weight, but it will be apparent to one skilled in the art that the movement of the diverter member could be mechanically coupled to the linear actuator to provide a positive engagement and retraction of the diverter. A counterweight 69 can be affixed to one end of the shaft 67 on the exterior of housing 37. This counterweight also serves as a flag or visual indicator visible from the ground to indicate to an operator whether the sleeve 53 is in its discharge or by-pass position.

Figure 11:
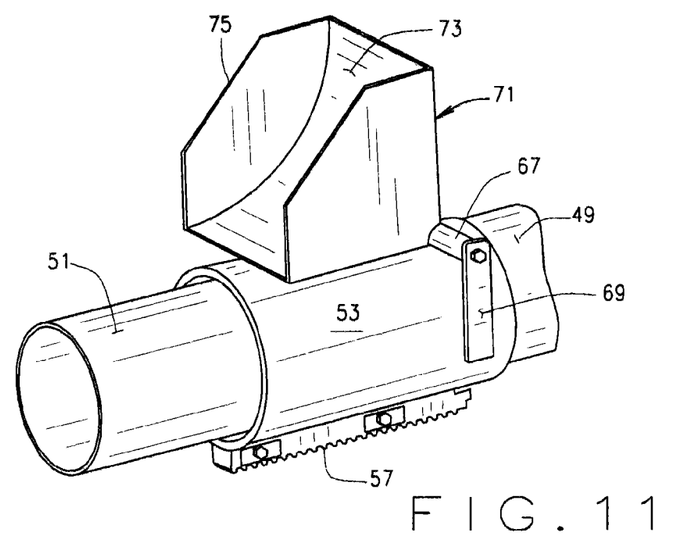
FIG. 11 is a view similar to FIG. 9 with the curved diverter member moved clear of the sleeve and with the sleeve axially extended so as to form a fluid tight (or air-tight) connection between the inlet and outlet couplings so that grain may by-pass the discharge outlet of the bin on which the valve is installed to be delivered to another bin.
Figure 15:
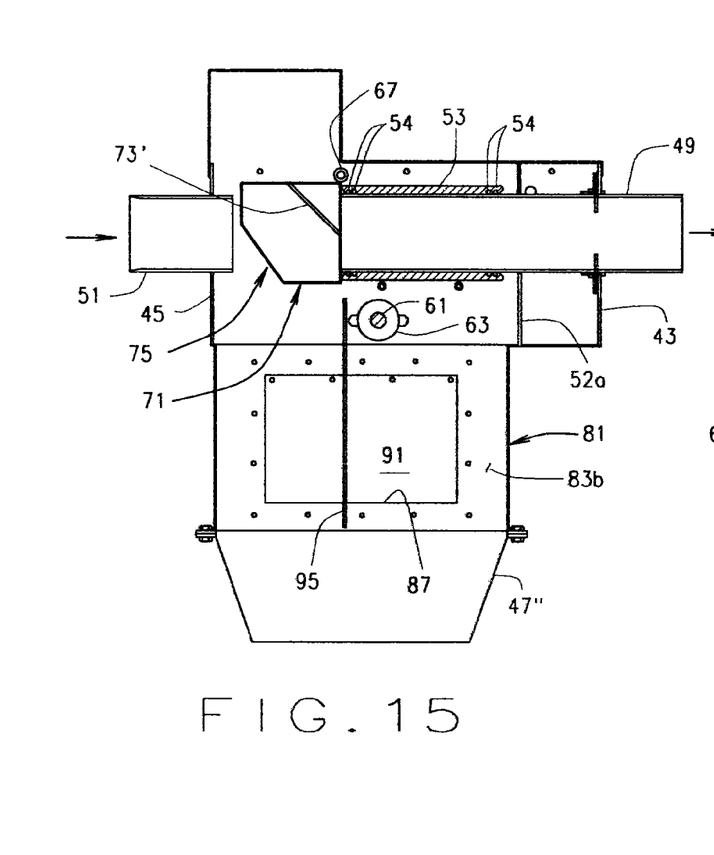
FIGS. 15 and 16 are cross-sectional views taken along lines 15-15 and 16-16, respectively of FIG. 12, but wherein the curved diverter plate of the valve of FIG. 12 is replaced with an inclined diverter plate.
Figure 16:
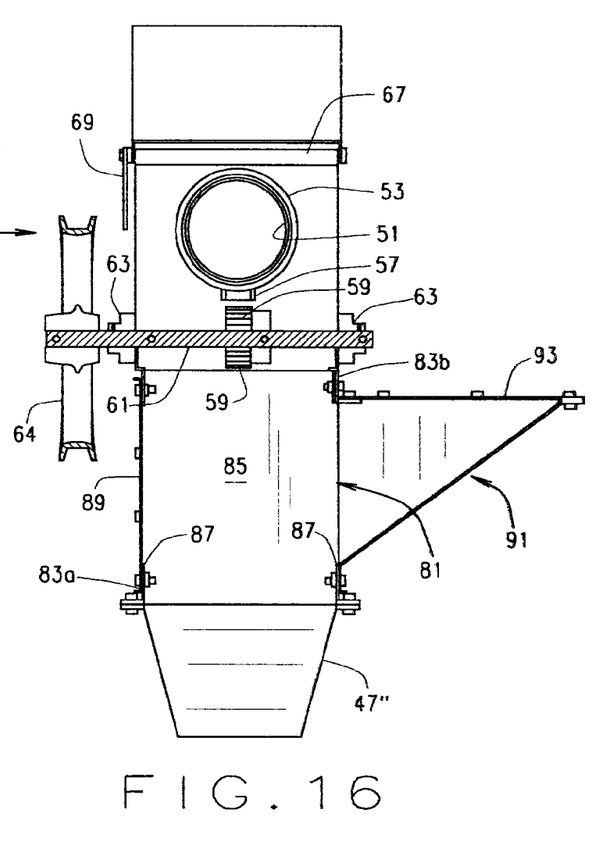

Referring now to FIGS. 7-10, a second embodiment of the discharge/bypass valve is indicated in its entirety by reference character 27'. The valve 27' is similar to valve 27, as described above, except the flapper diverter member 65 has been replaced by a curved diverter member 71. The other components of the alternate discharge/bypass valve 27' are similar to the corresponding components of the valve 27 and thus will not be again described. More specifically, the curved diverter member 71 has a curved deflector plate 73 within a diverter housing 75, as perhaps best shown in FIGS. 10 and 11. The curved plate 73 could be replaced with a sloped or inclined plate 73' as shown in FIG. 15 or a flat plate. With sleeve 53 in its retracted position clear of the inlet coupling 51, the diverter housing 75, which is mounted on shaft 67 for selective rotatary movement about the shaft, is movable between a lowered discharge position (as shown in 8 and 9) and a raised position (as shown in FIG. 11). In the lowered position, the curved plate 73 is positioned downstream from the inlet coupling tube 51 so that grain discharged from the inlet coupling tube impinges against the curved plate 73 and is directed downwardly into the discharge chute 47. The diverter housing 75 is also rotatably movable from its above-described lowered discharge position to a raised retracted position (as shown in FIG. 11) in which the sleeve 53 may be moved from its retracted discharge position to its extended by-pass position in which it is axially, sealably coupled to inlet coupling tube 51 so that grain may be conveyed through the valve 27' and into piping run 33 to the next grain storage bin. As with the diverter member 65, the diverter member 71 is pivoted from its lowered position to its raised position by the sleeve 53. It will be understood that the diverter member 71 may be gravity biased toward its lowered discharge position in the same manner as flapper diverter member 65, as above described, and likewise may be mechanically coupled to the linear actuator as previously described. Also, it will be understood that when sleeve 53 is axially moved from its retracted discharge position to its by-pass position in which it is in axial coupling engagement with inlet tube 51, the housing 75 is moved to its retracted position clear of the end of the sleeve. The valve 27" also includes the flag or indicator 69 which is rotationally fixed to the shaft 67 to indicate the position of the diverter member 71.

Figure 12:
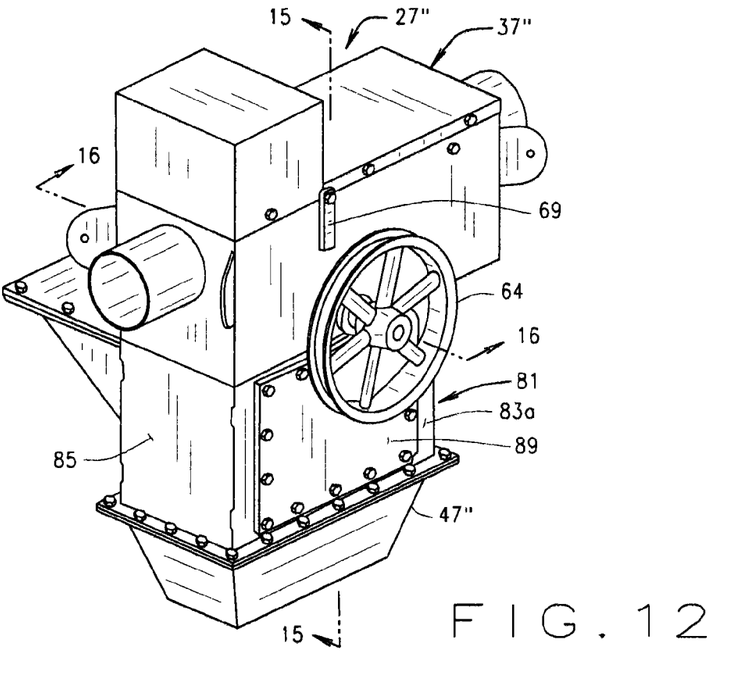
FIG. 12 is a perspective view of a third embodiment of the valve provided with a hopper to enable a bin on which the valve is placed to alternatively be filled by means of a traditional transport auger.
Figure 13:
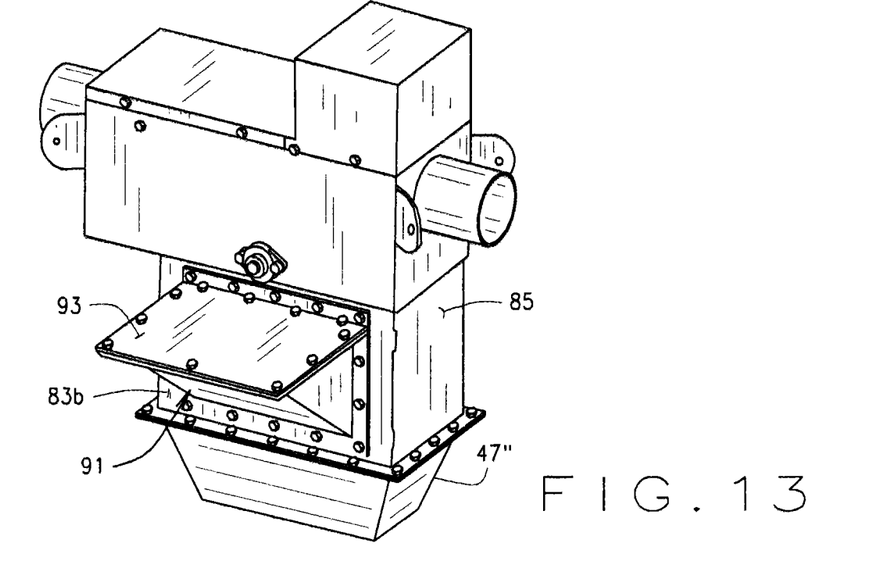
FIG. 13 is a perspective view of the valve of FIG. 12, but taken from an opposite side of FIG. 12.
Figure 14:
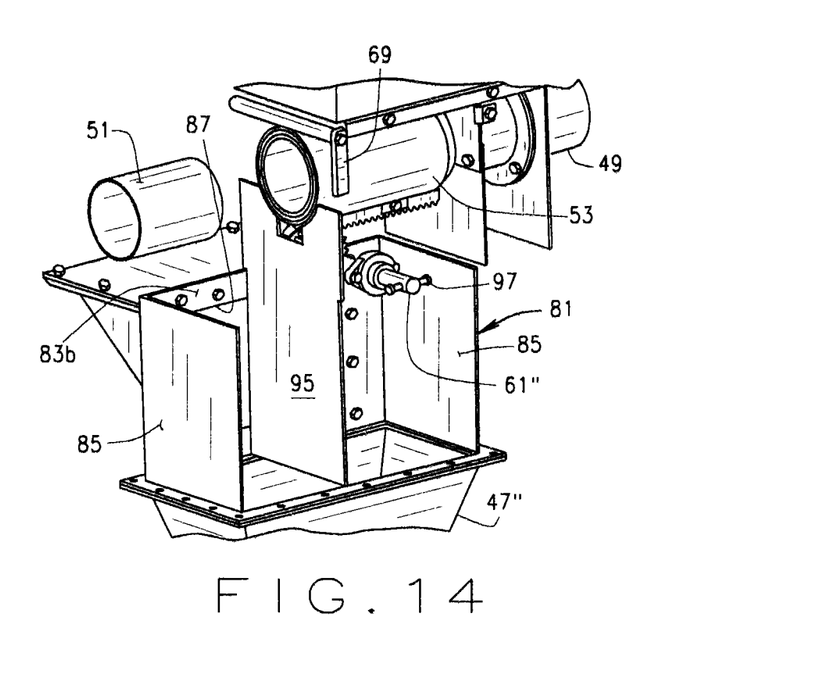
FIG. 14 is a perspective view of the valve of FIG. 12 with portions of the housing removed to show an internal wall of the valve.

Referring now to FIGS. 12-14, a third embodiment of the discharge/bypass valve is indicated in its entirety by reference character 27". The valve 27" is substantially the same as the valve 27'. The difference between the valves 27" and 27' lies in the housing of the two valves. The housing 37" of the valve 27" is provided with an intermediate section 81 between the discharge chute 47" and the couplings 49, 51 and the sleeve 53. This intermediate section 81 is defined by front and back walls 83*a,b* and end walls 85. At least one of the front and back walls, and preferably both of the front and back walls, are provided with an aperture 87 (FIG. 14). With reference to FIGS. 12 and 13, the aperture of the front wall 83*a* is closed by a plate 89, and the aperture of the back wall 83*b* is covered with a side hopper 91. The hopper 91 opens into the housing 37" below the elements of the valve (i.e., below the inlet and outlet couplings 51, 49 and the sleeve 53). The opening to the hopper 91 is closed by a cover plate 93. The cover plate 93 can be removed to open the hopper 91. With the hopper opened, the bin on which the valve 27" is mounted can be filled by means of a traditional auger. In this instance, the outlet of the auger would be just above, or received within, the opening to the hopper 91. The auger need not be permanently affixed to the hopper 91. The cover plate 93 is shown to be secured to the hopper by means of bolts, which would need to be removed to open the hopper for use. The hopper cover 93 can be hinged to the frame of the hopper, such that the cover 93 can be opened and closed either from ground level. The provision of the aperture 87 on both the front and back walls 83*a,b* allows for the hopper to be mounted to either the front or the back wall. It also allows for the hopper to be moved from the front to the back wall, should that be desired. Additionally, if desired, a hopper 91 could be mounted to both the front and back walls.

With reference to FIG. 14, the intermediate section 81 is provided with a vertical internal plate 95. The internal plate 95 is positioned to be generally flush with the inlet of the outlet coupling (and the end of the sleeve 53 when in the retracted position). In this way, the plate 95 will keep grain away from the linear actuator (i.e., the rack and pinion).

With reference to FIGS. 12 and 14, the sheave 64 is mounted to the shaft 61" by means of a bolt 97 which passes through a passage in the shaft 61". The opposite end of the shaft 61" includes a corresponding passage. This allows for the sheave 64 to be positioned on either side of the valve housing 37", or to be moved from one side to the other. Similarly, the counterweight 69, which serves as an indicator flag, can be mounted on either side of the housing, or moved from one side of the housing to the other.

The diverter members 65 and 71 are described to be moved from their lowered positions to their raised positions by the sleeve 53 as the sleeve moves to its by-pass position. However, the diverter members could be connected, for example by way of linkages, to the linear actuator, such that the diverter member is directly moved by the linear actuator.

It will be recognized that regardless of the embodiment of the valve 27, 27', or 27" that is utilized, the valve may be operated by its linear actuator 55 from the ground level without the necessity of shutting down the blower 13. This aids in switching the discharge of grain from one bin to another.

While the valves 27 and 27' of the present disclosure have been described in the environment of conveying grain to grain storage bins, those of ordinary skill in the art will appreciate that the air conveying system 1 may be used to convey other particulate or granular, fluent materials, such as powered materials or plastic pellets or the like that are capable of being pneumatically conveyed. Additionally, it will be appreciated that the grain storage bins may be any desired vessel for receiving the particulate or powdered material.

Figure 7:
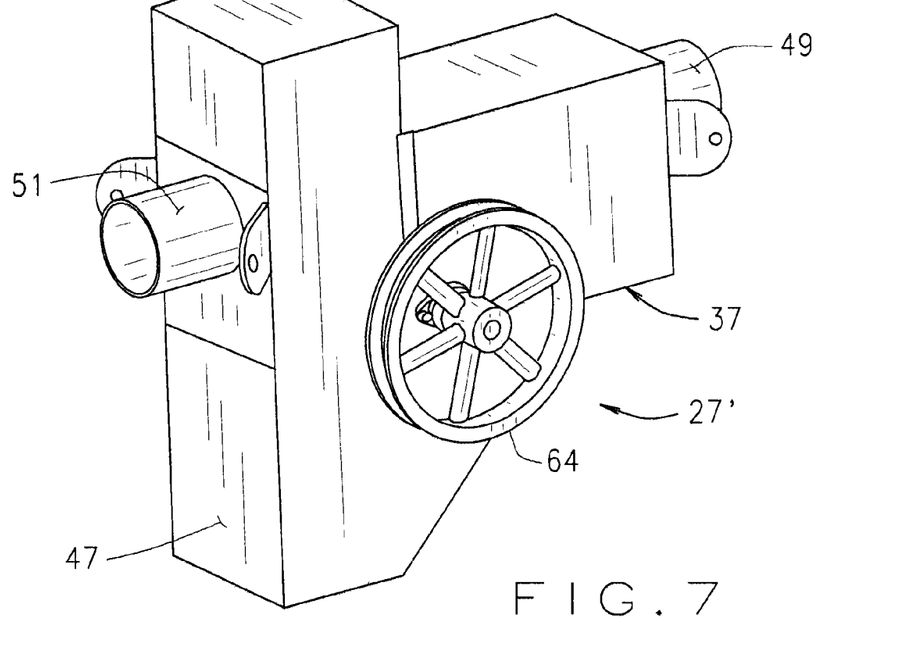
FIG. 7 is a perspective view of a second embodiment of the valve.
Figure 8:
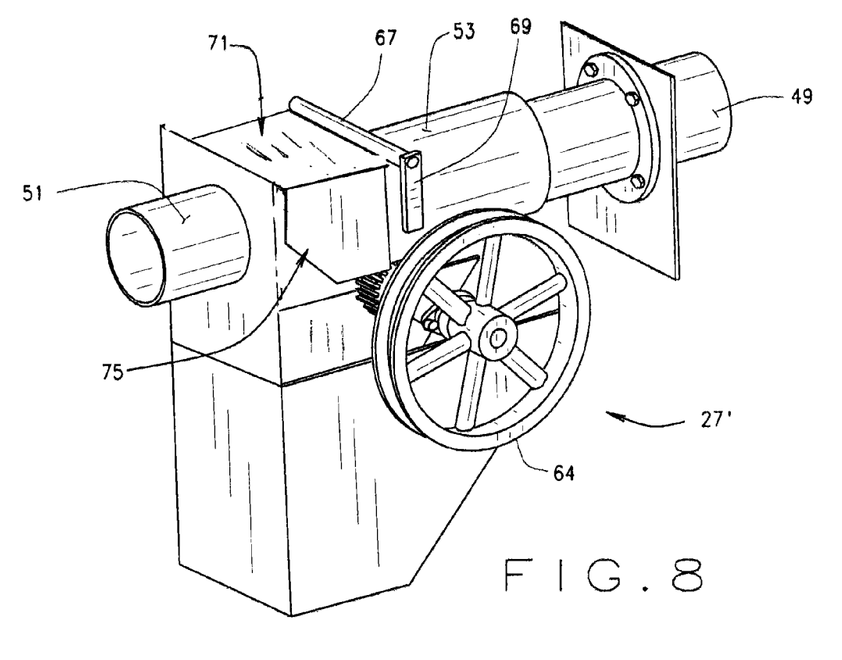
FIG. 8 is a perspective view of the second embodiment of the valve with portions of the outer housing removed to illustrate internal components, where the above-described flapper diverter member is replaced by curved grain diverter member selectably movable between a discharge position, as shown in FIGS. 8 and 9, in which, with the sleeve in its above-described by-pass position, grain may flow through the valve to a grain bin downstream from the first bin.
Figure 9:
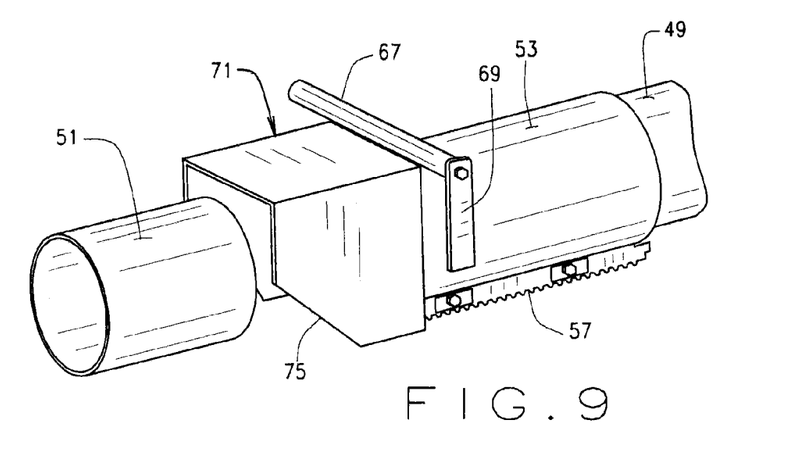
FIG. 9 is a view similar to FIG. 8 on a somewhat enlarged scale illustrating the axially movable sleeve in its retracted discharge position with the curved grain diverter member in its diverting position.
Figure 10:
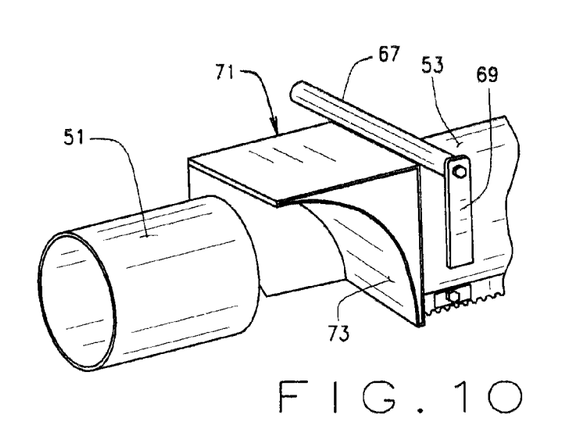
FIG. 10 is a view similar to FIG. 9, on an enlarged scale and with a side wall of the curved grain diverter member removed to better illustrate the curved plate of the diverter member.

Still further, those of ordinary skill in the art will recognize that the slidable sleeve 53 type diverter valve may be replaced with other types of diverter valves. For example, a rotary diverter valve, such as shown in U.S. Pat. No. 5,070,910 may be used to divert the flow of grain within valve 27 between a discharge position and a by-pass position. Further, a flapper-type diverter valve, such as shown in FIGS. 7-8B of U.S. Pat. No. 6,964,544 may also be used to divert the flow of grain within valve 27 between a discharge position and a by-pass position. U.S. Pat. Nos. 5,070,910 and 6,964,544 are herein incorporated by reference in their entirety. But neither of the above referenced valves provides a pneumatically sealed connection in only one selectable position and an unsealed, atmospheric connection in another selectable position. For the valves of the two referenced patents to work according to the valves 27, 27' or 27", the valves would have to be modified such that in a first position, the path between the inlet and a first outlet is sealed (i.e., air tight), and such that in a second position, the valve inlet is open to the atmosphere.

As various changes could be made in the above constructions without departing from the broad scope of the invention, it is intended that all matter contained in the above description or shown in the accompanying drawings shall be interpreted as illustrative and not in a limiting sense.

The invention claimed is:

1. A discharge/bypass valve adapted to be mounted to a vessel; said valve having a valve housing; an inlet; a discharge outlet formed by the bottom of the valve housing, and a bypass outlet; said valve inlet being defined by an inlet coupling and said bypass outlet being defined by an outlet coupling, said valve having a valve member between said inlet and by-pass outlet and which is movable between a discharge position in which a flowable dry product flowing into said valve is discharged through said discharge outlet and a by-pass position in which a flowable dry product passes through said valve from said inlet coupling to said outlet coupling; wherein, when said valve member is in said by-pass position there is a continuous fluid-tight path between said valve inlet and said valve bypass outlet; and when said valve member is in said discharge position, said valve inlet is in communication with the atmosphere, such that the pressure of fluid within said valve inlet is dissipated; wherein said valve member is a sleeve generally coaxial with said inlet and outlet coupling tubes, wherein, when said sleeve is in said discharge position, a discharge space is defined between an outlet of said sleeve and one of said inlet and outlet couplings and which is in communication with said discharge outlet of said valve, and when said sleeve is in said bypass position, said sleeve connects said inlet and outlet couplings such that said discharge outlet is bypassed, wherein said sleeve is within said valve housing in said discharge position and said by-pass position.

2. The valve as set forth in claim 1 wherein, said sleeve is in a retracted position when in said discharge position and in an extended position when in said bypass position; said valve including an inlet sealing member which forms a fluid tight seal between said sleeve and said inlet coupling tube when said sleeve engages said inlet coupling tube and an outlet sealing member which forms a fluid tight seal between said sleeve and said outlet coupling tube when said sleeve engages said outlet coupling tube.

3. The valve as set forth in claim 1 wherein said valve comprises an actuator operatively connected to said sleeve to selectively move said sleeve is between its said retracted and extended positions.

4. The valve as set forth in claim 3 wherein said actuator is a linear actuator effecting axial movement of said sleeve relative to said inlet and outlet couplings between its said first and second positions.

5. The valve as set forth in claim 2 wherein with said sleeve in its first or discharge position, flowable dry product is discharged through said discharge outlet, and wherein with said sleeve is in its second or by-pass position, fluent product by-passes the discharge outlet and exits the valve through the by-pass outlet.

6. The valve as set forth in claim 2 wherein said valve further comprises a diverter member movable between a retracted position when said sleeve is in its by-pass position and a diverting position when said sleeve is in its discharge position in which at least a portion of said diverter member extends into said discharge space such that product discharged from said inlet will impinge on said diverter member to be directed to said discharge outlet.

7. The valve as set forth in claim 6 wherein said diverter member is a flapper member mounted on a shaft for rotary movement between its said retracted and diverting positions.

8. The valve as set forth in claim 7 wherein said flapper member is a flat plate-like member.

9. The valve as set forth in claim 6 wherein said diverter member has a curved diverting plate against which said granular material discharged from said inlet impinges; said curved plate directing fluent product to said discharge outlet.

10. The valve as set forth claim 1 wherein said housing has an upper part which contains said inlet coupling, outlet coupling, and valve member; and a lower part; said housing including an upwardly opening hopper mounted to a first wall of said housing lower part, said hopper opening into said housing lower part below said inlet and outlet couplings and said valve member.

11. The valve as set forth in claim 10 wherein said hopper includes a cover plate which closes said hopper when not in use.

12. The valve as set forth in claim 11 wherein said cover plate is removable.

13. The valve as set forth in claim 11 wherein said housing includes a second opening in a second wall of said housing lower part; whereby, said hopper can be mounted to said housing lower part on said first wall or on said second wall; the housing including a cover plate to close the unused opening.

14. The pneumatic conveying system of claim 1 wherein said sleeve is axially moveable between said discharge position and said bypass position.

* * * * *